United States Patent [19]

Feasey et al.

[11] 3,948,857

[45] Apr. 6, 1976

[54] PROCESS FOR PREPARING AROMATIC POLYSULPHONES

[75] Inventors: Ronald George Feasey, Knebworth; Eric Nield, Watton-at-Stone; John Brewster Rose, Letchworth, all of England

[73] Assignee: Imperial Chemical Industries Limited, London, England

[22] Filed: June 11, 1974

[21] Appl. No.: 478,332

Related U.S. Application Data

[63] Continuation of Ser. No. 166,266, July 26, 1971.

[30] Foreign Application Priority Data

Aug. 6, 1970 United Kingdom.............. 37948/70

[52] U.S. Cl. ............................ 260/49; 260/79.3 M

[51] Int. Cl.[2] ......................................... C08G 75/24

[58] Field of Search ................... 260/49, 79.3 M, 79

[56] References Cited

UNITED STATES PATENTS 3,763,103 10/1973 Newton et al. ...................... 260/49

3,764,583 10/1973 Newton et al. ...................... 260/49

FOREIGN PATENTS OR APPLICATIONS 1,078,234 8/1967 United Kingdom.................. 260/49

1,177,183 1/1970 United Kingdom.................. 260/49

*Primary Examiner*—Lester L. Lee

*Attorney, Agent, or Firm*—Cushman, Darby & Cushman

[57] ABSTRACT

A process for the preparation of aromatic sulphone copolymers in which a polyaryl sulphone containing repeat units —Ar—$SO_2$— (where Ar is a bivalent aromatic residue which may vary from unit to unit in the polymer chain and at least some of the Ar units have an aromatic ether or thioether group in the polymer chain ortho or para to at least one —$SO_2$— group) is caused to react with an alkali metal salt of at least one halophenol or halothiophenol or with essentially equimolar quantities of an alkali metal salt of at least one dihydric phenol or thiophenol and at least one dihalobenzenoid compound, in which the halogen atoms are activated by an electron-attracting group.

5 Claims, No Drawings

PROCESS FOR PREPARING AROMATIC POLYSULPHONES

This is a continuation of application Ser. No. 166,266 filed July 26, 1971.

This invention relates to aromatic polysulphones and in particular to a method for the production of aromatic sulphone copolymers.

According to the invention, a process is provided for the preparation of aromatic sulphone copolymers in which a polyaryl sulphone containing repeat units —Ar—$SO_2$— (where Ar is a bivalent aromatic residue which may vary from unit to unit in the polymer chain and at least some of the Ar units have an aromatic ether or thioether group in the polymer chain ortho or para to at least one —$SO_2$— group) is caused to react with an alkali metal salt of at least one halophenol or halothiophenol or with essentially equimolar quantities of an alkali metal salt or at least one dihydric phenol or thiophenol and at least one dihalobenzenoid compound in which the halogen atoms are activated by an electron-attracting group.

Aromatic polysulphones containing aromatic ether or thioether groups in the polymer chain ortho or para to at least one —$SO_2$— group, and methods for making them are described in British Pat. Specification Nos. 1 016 245, 1 060 546, 1 078 234, 1 109 842, 1 122 192, 1 133 561, 1 153 035, 1 153 528, 1 177 183 and 1 234 301, U.S. Pat. No. 3 432 468, Netherlands Pat. No. 69 03070 and 70 11346 and German Pat. No. 1 938 806, the disclosures of which are incorporated herein by reference.

The aromatic polysulphones described in the above-mentioned specifications comprise repeating units of the formula

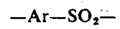

in which Ar is a bivalent aromatic radial and may vary from unit to unit in the polymer chain (so as to form copolymers of various kinds). Thermoplastic polysulphones generally have at least some units of the structure

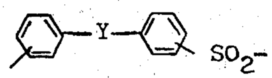

in which Y is oxygen or sulphur or the residue of an aromatic diol such as a 4,4'-bisphenol. One example of such a polysulphone has repeating units of the formula

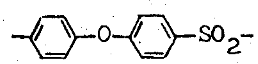

another has repeating units of the formula

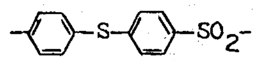

and others (which are commercially available in the United States of America) are said to have repeating units of the formula

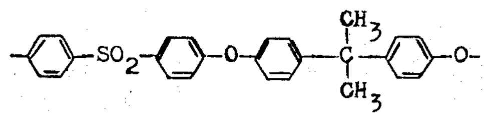

(Union Carbide Corporation) or copolymerised units in various proportions of the formulae

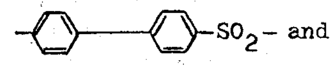

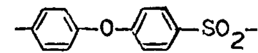

(Minnesota Mining and Manufacturing Company). Another group of thermoplastic polysulphones has repeating units of the formula

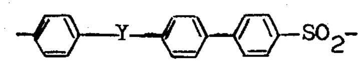

(where Y is oxygen or sulphur) which may be copolymerised with units of the other formulae given above.

Any halophenol (or halothiophenol) is suitable for the invention provided that the halogen atom is linked to an aromatic ring which has an activating electron-attracting group, preferably ortho or para to the halogen atom. The halophenol can have the halogen atom and hydroxyl or thiol group linked to the same benzenoid ring or to different benzenoid rings so long as the benzenoid ring to which the halogen atom is linked is activated by an electron-attracting group. Any dihalobenzenoid compound can be employed on this invention provided that the two halogen atoms are bonded to benzene rings having an activating electron-attracting group in at least one of the positions ortho or para to the halogen groups. The dihalobenzenoid compound can be either mononuclear (where the halogens are attached to the same benzenoid ring) or polynuclear (where they are attached to different benzenoid rings), as long as there is the activating electron-attracting group preferably in the ortho or para position of that benzenoid nucleus.

Any electron-attracting group inert under the conditions of the reaction can be used as the activating group in these compounds. The more powerful electron-attracting groups give the highest reaction rates and are therefore preferred. Electron-donating groups should be absent from the same benzenoid ring as the halogen. The electron-attracting group may be a univalent group that can activate one or more halogen atoms on the same ring, such as for example a nitro, phenylsulphonyl, alkylsulphonyl, cyano, trifluoromethyl or nitroso group or a hetero-aromatic nitrogen as in pyridine; the electron-attracting group may be a divalent group which can activate displacement of halogen atoms on two different rings, e.g.: —$SO_2$—; —CO—; —SO—; —CH=CH—; —N=N—; —$CF_2CF_2$—; —PR(=O)— (where R is a hydrocarbon group): or —C(=$CX_2$)— (where X can be hydrogen or halogen); or the electron-attracting group may be a divalent group which can activate halogens on the same ring such as in difluorobenzoquinone, 1,4- or 1,5- or 1,8-difluoroanthraquinone, tetrachlorobenzoquinone or hexachlorobenzene.

In particular, the halophenol or dihalobenzenoid compound may have the formula

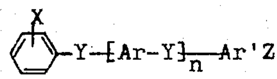

in which X is a halogen atom, Z is respectively a hydroxy or thiol group or a halogen atom and the groups Y may be the same or different and are —$SO_2$—, —SO—, —CO— or radicals of the formula —Y′—A—Y″— in which Y′ and Y″ may be the same or different and each is —$SO_2$—, —SO— or —CO— and A is a bivalent organic radical, which may be aliphatic, aromatic or heterocyclic and has both valencies linked to carbon atoms. Ar and Ar′ are bivalent aromatic radicals which may be the same or different and n is zero or an integer from 1 to 200. For example, A may be a bivalent aromatic radical derived from benzene, a fused ring aromatic hydrocarbon containing not more than two aromatic rings (for example naphthalene, indene, fluorene or dibenzofuran) or a compound of the formula

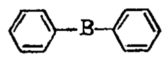

in which B is a direct link, —O—, —S—, —$SO_2$, ——CO—, a bivalent hydrocarbon or substituted hydrocarbon radical (e.g. alkylene, alkylidene or a bivalent cycloaliphatic or aromatic radical), or a residue of an organic diol or dithiol (i.e. the bivalent radical obtained by removing the hydrogen atoms from the two hydroxy or thiol groups). The halogen atom is preferably in the para position to the bridging group Y.

The bivalent aromatic radicals Ar and Ar′ may be similar to radical A described above where A is aromatic.

Preferred halophenols are

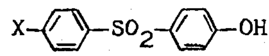

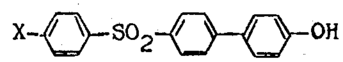

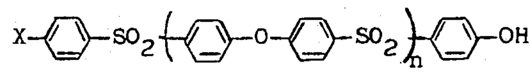

where $n$ is greater than 1 and some of the units

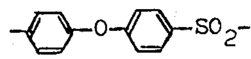

may be replaced in varying proportions by units having the formula

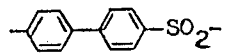

Any dihydric pheno. (or thiophenol) can be used for the invention. The phenol can be mononuclear (where the hydroxyl or thiol groups are attached to the same benzenoid ring) or polynuclear (where they are attached to different benzenoid rings). The phenols may be substituted with inert substituents for example alkoxy and alkyl groups. For example the dihydric phenol may have the formula

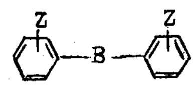

in which Z is a hydroxyl or thiol group and B is hereinbefore defined. The dihydric phenol may be for example any of those described in British Pat. Specification No. 1 078 234 and the dihydric thiophenol may be for example any of those described in U.S. Pat. No. 3 432 468. Preferred dihydric phenols are 4,4′-dihydroxybiphenyl and 2,2-bis(4-hydroxyphenyl) propane (Bisphenol A).

Lower alkyl, alkoxy or alkylthio groups may be present as substituents on any of the aromatic rings but are preferably absent from the halogen-bearing rings and are also preferably absent altogether when the aromatic copolymer is required to be stable at high temperatures.

If desired, the copolymers can be prepared using mixtures of two or more materials selected from halophenols, halothiophenols, dihydric phenol/dihalobenzenoid compound combinations, and dihydric thiophenol/dihalobenzenoid compound combinations, and the halo compounds may contain different electron-attracting groups.

The halogen atoms in the halo compounds are preferably chlorine or fluorine. The fluorine derivatives generally are more reactive and enable the displacement of alkali metal halide to be carried out more quickly, but are more expensive. Bromine derivatives are also relatively expensive and although they resemble the chlorine derivatives in performance they would seem to offer no advantages. Iodine derivatives are generally less suitable.

The alkali metal associated with the phenolic or thiophenolic groups is conveniently potassium or sodium. Displacement of the alkali metal halide often occurs more readily if the potassium cation is present in the reagent used, but the weight (and usually the price) per mole of a potassium compound is higher than for the corresponding sodium compound.

The copolymers prepared according to the reaction may range from block copolymers to random copoly-

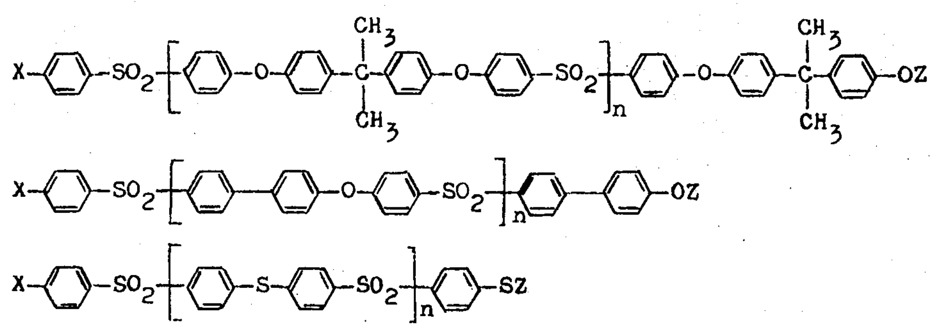

mers depending on the relative reactivities and concentrations of the polyarylsulphone and other reactants present.

The copolymerisation reaction may be carried out in the melt or in the presence of a dipolar aprotic liquid under essentially anhydrous conditions. Suitable liquids for the reaction include the lower dialkyl and cyclic alkylene sulphoxides and sulphones (e.g. dimethyl sulphoxide and 1,1-dioxothiolan), aromatic nitriles (e.g. benzonitrile) and diaryl ketones (e.g. benzophenone), sulphoxides and sulphones. Mixtures of such substances may conveniently be used, e.g. when one or more components of the mixture would otherwise be solid at the reaction temperature. The liquid (or mixture of liquids) should be a solvent for the alkali metal salt of the halophenol or halothiophenol or the dihalobenzenoid compound and alkali metal salt of the dihydric phenol or thiophenol and preferably it should also be a solvent for the polyaryl sulphone. The amount of the liquid is relatively unimportant provided it is sufficient to dissolve the reactants and is not too large to be economically disadvantageous. The total amount of solvent used is desirably sufficient to ensure that none of the starting materials are in the solid state in the reaction mixture. The liquid initially present in the reaction medium need not be the same as that present during the final formation of the polymer. The original liquid may be allowed to remain during the reaction, with the subsequent addition of any desired solvents, or it may be removed, e.g. by distillation.

The rate of copolymer formation in the reaction of the invention rises with rise of temperature and below 200°C may be slow. It may however be advantageous to preheat the reaction mixture between 100°C and 200°C and then raise the temperature to produce the polymer. Temperatures up to 400°C may be employed, and 250°–350°C is usually convenient.

The reaction may be carried out under pressure if necessary to prevent the escape of any volatile solvent or cosolvent. Heating in vacuum may however be desirable at a later stage to remove unwanted solvents, e.g. dimethyl sulphoxide which decomposes at the temperatures required to produce high polymer.

The vessel used should be made of or lined with a material that is inert to alkali and also to alkali metal halides under the conditions employed. For example, glass is unsuitable as it tends to react with alkali at high temperatures, contaminating the product with silicate and possibly upsetting the stoichiometry of the polymerisation. Some grades of stainless steel undergo surface crazing at these temperatures in the presence of alkali metal halide, and vessels made of or lined with titanium or nickel or an alloy thereof or some similarly inert material are preferable.

The copolymerisation must be conducted under substantially anhydrous conditions to obtain products of high molecular weight.

When the copolymer is formed in solution, a convenient procedure is to add the reaction mixture (which may be decanted or filtered from solid alkali metal halide) to an excess of a liquid which is miscible with the reaction solvent but in which the copolymer is insoluble. If the reaction solvent is water-miscible, or is miscible with a liquid in which residual alkali metal halide also dissolves, the copolymer can thus be obtained in one step. Otherwise, as for example if the reaction mixture is poured into methanol, the precipitated copolymer initially contains alkali metal halide which can subsequently be washed out with water.

The following examples illustrate the invention.

EXAMPLE 1

A solution in dimethyl sulphoxide (300 ; cm³) of the potassium salt of 4-(4-chlorophenylsulphonyl)phenol, (117 g; 0.433 mole; prepared in a manner similar to that described in Example 10 of British Pat. Specification No. 1 153 035), a polyaryl sulphone having repeating units of the structure

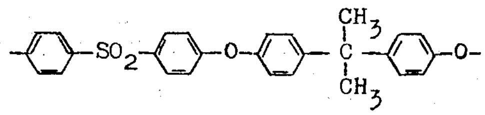

(21.2 g; 0.048 mole calculated on the repeating unit; Union Carbide Corporation "Polysulfone" P 1700) and 1,1- dioxothiolan (200 cm³) were charged to a round-bottom flask fitted with a stirrer, a vacuum still head and a dry nitrogen inlet. Dimethyl sulphoxide was distilled at 78°–82°C under reduced pressure (20 torr) and then the temperature of the boiling mixture was allowed to rise to 130°C whilst about 100 cm³ of 1,1-dioxothiolan distilled at 20 torr. The pressure in the flask was returned to atmospheric pressure by the admission of nitrogen and the reaction mixture was then stirred at 200°C for 18 hours under a stream of dry nitrogen.

The viscous reaction products were diluted with dimethyl formamide until freely fluid and the resulting solution was cooled and then dripped into stirred methanol. The copolymer which precipitated was collected, extracted with hot methanol and dried in vacuo. The copolymer (105 g) had reduced viscosity 0.55, measured at 25°C on a 1% w/v solution in dimethyl formamide (i.e. a solution containing 1 g of polymer in 100 cm³ of solution) and was composed of units of the structures

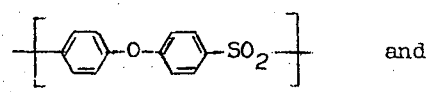

and

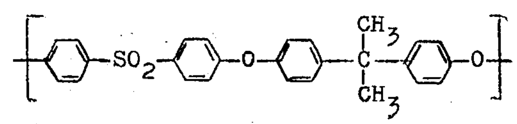

in the molar ratio of the starting materials, i.e. approximately 90% molar of the former and 10% molar of the latter. The copolymer was compression-moulded at 350°C into tough plaques.

A similar copolymer could be prepared by heating a polyaryl sulphone consisting of repeating units of the formula

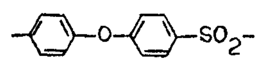

with equimolar amount of bis-(4-chlorophenyl)sulphone and the dipotassium salt of 2,2-bis-(4-hydroxyphenyl)propane in 1,1-dioxothiolan, the molar proportions of polymer, bis-(chlorophenyl)sulphone and bis(-hydroxyphenyl)propane being 18:1:1 respectively.

EXAMPLE 2

A series of copolymers was prepared by the method of Example 1 from the same starting materials but in different molar proportions, in order to observe the variation in impact strength and softening point with copolymer composition. The results are shown in the following table from tests performed on specimens taken from plaques which were prepared from copolymer compression moulded at 350°C.

| | | | | | | | | | |
|---|---|---|---|---|---|---|---|---|---|
| potassium 4-(4-chlorophenyl-sulphonyl)-phenate (% molar) | | 90 | 75 | 60 | 50 | 40 | 25 | 10 | 0 |
| Union Carbide "Polysulfone" P 1700 (% molar) | | 10 | 25 | 40 | 50 | 60 | 75 | 90 | 100 |
| Reduced viscosity (1% w/v at 25°C in dimethyl-formamide) | | 0.55 | 0.42 | 0.43 | 0.49 | 0.54 | 0.53 | 0.40 | 0.37 |
| Notched Impact Strength (kJ/m²) | | — | 31.9 | 40.2 | 45.8 | 57.2 | 56.0 | 34.6 | 36.0 |
| Vicat Softening Point (°C) | Full | 209 | 211 | 202 | 205 | 202 | 197 | 191 | 188 |
| | One-tenth | 200 | 201 | 194 | 198 | 191 | 187 | 183 | 181 |

For the notched impact strength test, carried out at 20°C, a specimen 51 mm long, 6.3 mm wide, and 3 mm thick was given a 45° notch 2.8 mm deep (tip radius 2.0 mm) in the center of one edge. It was supported between two supports 38 mm apart and struck centrally on the edge opposite the notch by a pendulum dropping from 305 mm with more than sufficient energy to break the specimen. From the residual energy of the pendulum, the energy required to break the specimen was calculated and divided by the cross-sectional area of the specimen at the notch. The resulting value (expressed in kJ/m²) represents the energy required to break the material.

The homopolymer of the potassium salt of 4-(4-chloro phenylsulphonyl) phenol was prepared in a manner similar to that described in Example 3 of British Pat. Specification No. 1 153 035. The polymer blends were prepared on a Brabender "Plasticorder" by milling the constituent polymers in the molar ratios given for 8 to 10 minutes at 100 rpm at 280°C.

The copolymers containing more than 10% molar of Union Carbide Polysulfone also differed from blends of homopolymers of the constituent units in their solubility characteristics, remaining in solution under conditions in which the blends deposited crystalline polymer. This is shown in the following table describing the crystallisation behaviour of the materials when 5 g of polymer was dissolved in 20 cm³ of nitrobenzene at 100°C and the solution was allowed to cool to room temperature.

| Union Carbide "Polysulfone" | Units from potassium 4-(4-chlorophenylsulphonyl)-phenate | Crystallisation behaviour |
|---|---|---|
| 100% molar | 0% molar | still in solution |
| 50% molar | 50% molar (blend) | crystallised |
| 40% molar | 60% molar (copolymer) | still in solution |
| 25% molar | 75% molar (copolymer) | still in solution |
| 10% molar | 90% molar (blend) | crystallised |
| 10% molar | 90% molar (copolymer) | crystallised |
| 0% molar | 100% molar | crystallised |

EXAMPLE 3

A solution in dimethyl sulphoxide (300 cm³) of the potassium salt of 4-(4-chlorophenylsulphonyl)phenol, (117 g; 0.433 mole; prepared in a manner similar to that described in Example 10 of British specification 1 153 035), a polyaryl sulphone having repeating units of the structures

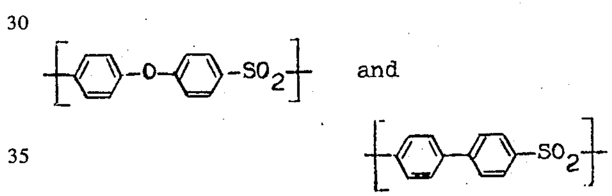

(21.5 g; "Astrel", Minnesota Mining and Manufacturing Co.) and 1,1-dioxothiolan (200 cm³) were changed to a roundbottom flask fitted with a stirrer, a vaccum still head and a dry nitrogen inlet. Dimethyl sulphoxide was distilled at circa 80°C under reduced pressure and then the temperature of the boiling mixture was allowed to rise to 130°C whilst about 100 cm³ of 1,1-dioxothiolan distilled. The pressure in the flask was returned to atmospheric by the admission of nitrogen and the reaction mixture was then stirred at 230°C for 18 hours under a stream of dry nitrogen.

The reaction mixture was then saturated with gaseous methyl chloride for 30 minutes and worked up as described in Example 1. The copolymer had reduced viscosity 0.43, measured at 25°C on a 1% w/v solution in dimethyl formamide and was composed of units of the structures

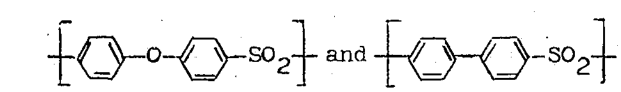

in the approximate molar ratio 90:10. The copolymer was extruded at 380°C into a tough, amber lace.

We claim:

1. A process for the preparation of aromatic sulphone copolymers in which a polyaryl sulphone containing repeat units —Ar-$SO_2$—, where Ar is a bivalent aromatic residue which may vary from unit to unit in the polymer chain and at least some of the Ar units have an aromatic ether or thioether group in the polymer chain ortho or para to at least one $—SO_2—$ group, is charged to a reaction vessel and reacted with reactive material selected from the group consisting of (i) at least one alkali metal salt of a halophenol or halothiophenol and (ii) at least one mixture of essentially equimolar quantities of (a) at least one alkali metal salt of a dihydric phenol or thiophenol and (b) at least one dihalobenzenoid compound in which the halogen atoms of the halophenol, halothiophenol and dihalobenzenoid compound are activated by an electron-attracting group which is inert to the reaction, said reactive material being polymerisable to give a polymer of different constitution to that of said polyarylsulphone, after which the copolymer so formed is recovered from the reaction mixture.

2. A process according to claim 1 in which the polyaryl sulphone contains units having the formula

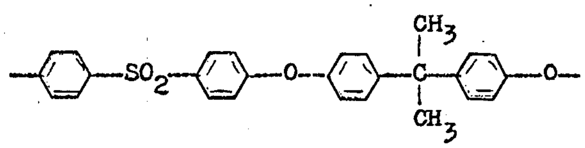

3. A process according to claim 1 in which the polyaryl sulphone contains units having the formula

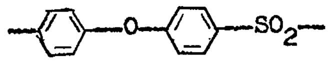

4. A process according to claim 3 in which the polyaryl sulphone contains copolymerised units of the formulae

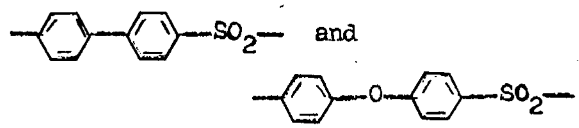

5. A process according to claim 1 in which the polyaryl sulphone is caused to react with an alkali metal salt of a halophenol having the formula

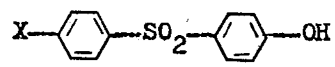

where X is a halogen atom.

* * * * *